(12) United States Patent
Lewen et al.

(10) Patent No.: US 10,180,588 B1
(45) Date of Patent: Jan. 15, 2019

(54) REDUCED-CROSS-TALK COHERENT OPTICAL TRANSMITTER

(71) Applicant: Finisar Corporation, Horsham, PA (US)

(72) Inventors: Robert Lewen, Tyreso (SE); Andrei Kaikkonen, Jarfalla (SE); Christopher Daunt, Solna (SE); Marek Chacinski, Farsta (SE)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 16/040,121

(22) Filed: Jul. 19, 2018

(51) Int. Cl.
*G02F 1/025* (2006.01)
*G02F 1/225* (2006.01)
(Continued)

(52) U.S. Cl.
CPC ............ *G02F 1/025* (2013.01); *G02F 1/0121* (2013.01); *G02F 1/0316* (2013.01); *G02F 1/2257* (2013.01); *G02F 2001/212* (2013.01)

(58) Field of Classification Search
CPC ....................................................... G02F 1/025
See application file for complete search history.

(56) References Cited

U.S. PATENT DOCUMENTS

| 9,507,235 | B2 * | 11/2016 | Sugiyama | ................ | G02F 1/21 |
| 2016/0011486 | A1 * | 1/2016 | Sugiyama | ................ | G02F 1/21 398/188 |
| 2017/0054511 | A1 * | 2/2017 | Bianciotto | ......... | H04B 10/5053 |

* cited by examiner

Primary Examiner — Sung H Pak (74) *Attorney, Agent, or Firm* — Kurt Rauschenbach; Rauschenbach Patent Law Group, LLP

(57) ABSTRACT

An electro-optical modulator includes a substrate comprising a first Mach-Zehnder modulator comprising a first waveguide and a second waveguide and a second Mach-Zehnder modulator comprising a first waveguide and a second waveguide. A first positive signal electrode is positioned on the substrate over the first waveguide of the first Mach-Zehnder modulator and a first negative signal electrode is positioned on the substrate over the second waveguide of the first Mach-Zehnder modulator. The first positive signal electrode and the first negative signal electrode are connected to a first differential signal input. A second positive signal electrode is positioned on the substrate over the first waveguide of the second Mach-Zehnder modulator and a second negative signal electrode positioned on the substrate over the second waveguide of the second Mach-Zehnder modulator. The second positive signal electrode and the second negative signal electrode are connected to a second differential signal input. A first ground electrode is positioned on the substrate between the first and second Mach-Zehnder modulators connected to ground potential. A second ground electrode is connected to ground potential and positioned on the substrate adjacent to the first Mach-Zehnder modulator such that the first positive signal electrode and the first negative signal electrode are between the second ground electrode and the first ground electrode. A third ground electrode is connected to ground potential and positioned on the substrate adjacent to the second Mach-Zehnder modulator such that the second positive signal electrode and the second negative signal electrode are between the third ground electrode and the first ground electrode. A plurality of first electrical connectors connect the first ground electrode to the second ground electrode and a plurality of second electrical connectors connect the first ground electrode to the third ground electrode. A spacing between at least two of the plurality of first electrical connectors is chosen to achieve a desired cross talk between an optical signal generated by the first Mach-Zehnder modulator and an optical signal generated by the second Mach-Zehnder modulator.

24 Claims, 6 Drawing Sheets

(51) Int. Cl.
*G02F 1/03* (2006.01)
*G02F 1/01* (2006.01)
*G02F 1/21* (2006.01)

REDUCED-CROSS-TALK COHERENT OPTICAL TRANSMITTER

The section headings used herein are for organizational purposes only and should not to be construed as limiting the subject matter described in the present application in any way.

INTRODUCTION

The ever-increasing demand for optical fiber communication capacity continues to drive improvements in optical transmitter technology used in long-haul and metro-scale optical network deployments. The need to address the combination of large bandwidth requirements, high port density, and lower system power consumption continue to push technology limits. In-Phase Quadrature-Phase (IQ) optical modulators support the high modulation bandwidths in today's coherent optical systems. Important modulator performance parameters for this application include low drive voltage to produce a phase shift of π-radians, $V_\pi$, high linearity, high modulation bandwidth, and low insertion loss. In addition, high-capacity systems demand a small form factor and high component reliability.

Current generation IQ modulators rely heavily on lithium niobate LiNbO$_3$ technology. Lithium niobate modulators require a larger modulator size that is needed to achieve low drive voltages. In contrast, compound III-V semiconductor-based modulator technologies, such as GaAs modulator technologies, have the potential for high bandwidth and compact device configurations, and III-V devices are already widely used as optical laser sources and detectors in currently deployed telecommunications systems. Indium phosphide (InP) technology, in particular, is well suited for modulating telecommunication system wavelengths. Indium phosphide technology is also compatible with wafer-scale fabrication that allows precise process controls and can be used with low cost packaging. These features of indium phosphide technology have dramatically reduced the cost of InP modulator components, enabling InP modulators to have an acceptable cost per transmitted bit. Other optical materials used to form IQ modulators include, for example, Si and Silicon on Insulator. Numerous technical challenges exist for IQ modulators made from all these materials to provide both high modulation bandwidth and low cross talk operation.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Digital coherent transmission has become a popular technology for telecommunications systems at high bit rates, including bit rates of 100 Gb/s, 200 Gb/s, 400 Gb/s and beyond. Various combinations of polarization multiplexing and advanced modulation formats, for example quadrature phase shift key (QPSK) and quadrature amplitude modulation (QAM), are used to provide high bit rate in spectrally-efficient DWDM transmission systems.

Digital coherent optical transmitters have many desirable features. One feature is that digital coherent optical transmitters offer flexibility in the transmitted data rates afforded by the use of advanced electrical modulation schemes while the underlying component hardware remains the same. Another feature of digital coherent transceivers is that they allow for the compensation of chromatic dispersion, polarization dispersion, and other impairments in long haul optical transport systems. Another feature of digital coherent optical transmitters is that they can have a high-level of integration with relatively low power consumption and relatively low cost making them suitable for intra and inter data center applications with shorter reach.

Another feature of digital coherent optical transmitters is that they have relatively high bandwidth that can support relatively high data rates. It is desirable for optical transmitter IQ modulators to support analog electrical bandwidths of >25 GHz. Modulators for long haul applications also benefit from low insertion loss over the C-Band wavelength range of Erbium-doped fiber amplifiers to allow for the long transmission distances with reduced transmitter laser power consumption. In many applications, wavelength tunability is desired. Optical transmitter IQ modulators also benefit from having a high extinction ratio that allows generation of high-quality high-order-modulation-format signals.

Furthermore, tight electrical power consumption restrictions in state-of-the-art systems require modulators with a low $V_{pi}$ in order to maintain a relatively low driving voltage out of the RF electronics to ensure good linearity. It is also desirable that these modulators have a relatively small physical size, especially for pluggable transceivers, such as those conforming to the CFP-x form factor, where the available space is extremely limited.

Figure 1:
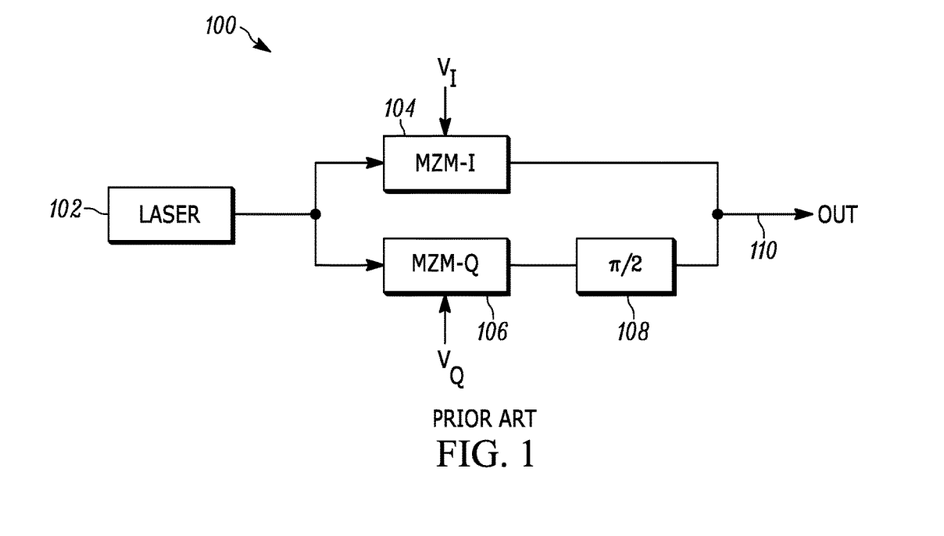
FIG. 1 illustrates a schematic of a known coherent optical transmitter using I and Q Mach-Zehnder modulators.

FIG. 1 illustrates a schematic of a known coherent optical transmitter 100 using I and Q Mach-Zehnder modulators. A laser 102 generates an optical signal. The laser 102 may be a tunable wavelength laser or a fixed wavelength laser. Light from the laser is split into two paths. Light from the first path is sent to an input of a first Mach-Zehnder modulator (MZM) 104 that generates the in-phase-modulated optical signal at an output. This is sometimes referred to as the I branch of the IQ modulator. Light from the second path is sent to an input of a second Mach-Zehnder modulator 106 that generates the quadrature-modulated optical signal at an output. This is sometimes referred to as the Q branch of the IQ modulator. The output signal from the Mach-Zehnder modulator 106 is passed through a phase shifter 108, for example π/2 phase shifter. The signals from the outputs of the first and second Mach-Zehnder modulator 104, 106 are combined to form an output 110 of the coherent optical transmitter 100.

The modulator configuration of the coherent optical transmitter 100 illustrated in FIG. 1 is sometimes referred to as a nested Mach-Zehnder modulator. These nested Mach-Zehnder modulator configurations provide a high-performance optical modulator that produces a variety of flexible modulation formats. They are also capable of high bit rate operations. These nested modulators typically include a parent Mach-Zehnder modulator that consists of two or more child modulators.

In the example of FIG. 1, two child modulators 104, 106 are nested within a parent modulator that provides an optical signal at the output 110. More complex coherent optical transmitter structures that are constructed using multiple IQ modulator structures are also known in the art. For example, some optical transmitters use multiple nested Mach-Zehnder (MZ) modulator architectures. One example is a dual-polarization IQ transmitter. In these transmitters, one parent modulator generates, for example, an X-polarized signal and a second parent generates a Y-polarized signal. One skilled in the art will appreciate that these dual polarization IQ transmitters, and other more complex, coherent optical transmitters using nested Mach-Zehnder modulator configurations, will benefit from the system and method for crosstalk reduction according to the present teaching.

One feature of the present teaching is a modulator design that uses a travelling-wave electrode (TWE) structure. The travelling wave electrode structure can be used in a differential dual-drive mode using two signal electrodes. The TWE structure provides a combination of low $V_{pi}$, small size, and high bandwidth, which allows the optimization of the electro-optic frequency response for high bitrate applications, while still maintaining a very high drive voltage efficiency.

One embodiment of an optical modulator according to the present teaching includes a differential drive. A first signal electrode is fabricated on an optical waveguide that forms a first arm of a Mach Zehnder interferometric modulator. A first ground electrode is fabricated adjacent to the first signal electrode. A second signal electrode is fabricated on the optical waveguide that forms a second arm of the MZ modulator. A second ground electrode is fabricated adjacent to the second signal electrode. The signal and ground electrodes form coplanar waveguides that run along the length of the underlying optical waveguide. The electrodes propagate phase-modulating RF signals that modulate the phase of the optical wave propagating in the waveguide. The applied RF electrical signals co-propagate along with the optical signal. In this way, the first and second signal electrodes provide signals that drive two independent phase modulators.

Figure 2:
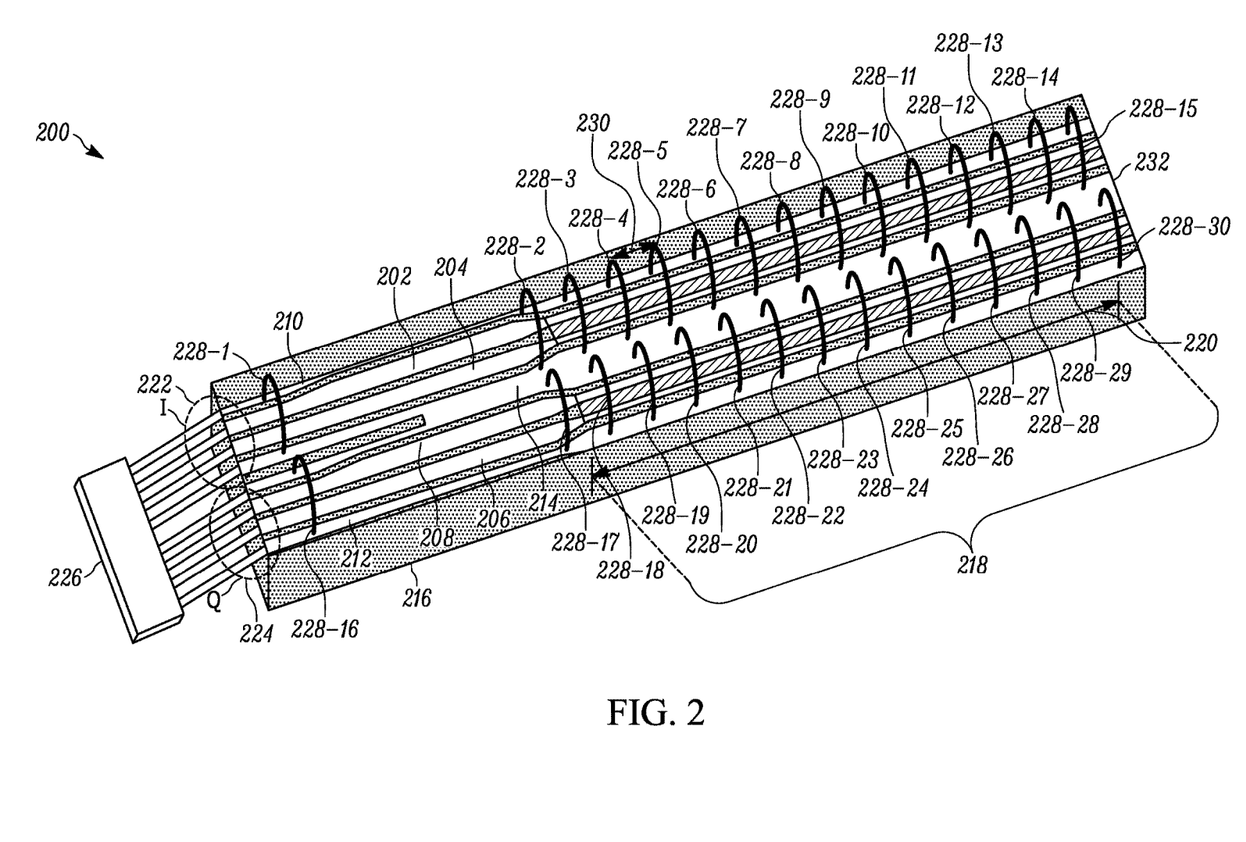
FIG. 2 illustrates a schematic showing the top electrode configuration of an embodiment of an electro-optical IQ travelling wave Mach-Zehnder modulator according to the present teaching.

FIG. 2 illustrates a schematic showing the top electrode configuration of an embodiment of an electro-optical IQ travelling wave Mach-Zehnder modulator structure of the present teaching. The electrodes 202, 204, 206, 208, 210, 212, 214 are formed on a substrate 216. The substrate 216 includes optical waveguides that are positioned underneath some of the electrodes and are not visible in FIG. 2. The optical modulation is generated along a modulation region 218 that defines a modulator length 220. For example, in some embodiments, the modulator length 220 can be about 3 mm and in other embodiments, the modulator length can be about 5 mm.

The modulator length generally represents the length that the co-propagating optical signal and electrical signal traverse. This is the length over which the optical signal accumulates the electro-optically imparted phase shift. Modulator length is often associated with particular desired operating bandwidths, with longer modulators appropriate for lower bandwidth and shorter modulators appropriate for higher bandwidth. For telecommunication and/or data communication applications, an approximate modulation length for typical 64 GBd or 100 GBd signaling is about 3 mm. An approximate modulation length for lower 32 GBd signaling is about 5 mm. One skilled in the art will appreciate that numerous other modulation lengths can be used depending on the signaling rates.

The I branch 222 of the modulator 200 includes two signal electrodes 202, 204 that can be referred to as I-signal electrodes. The Q branch 222 of the modulator 200 includes two signal electrodes 206, 208, which can be referred to as Q-signal electrodes. The I branch 222 of the modulator 200 includes one ground electrode 210 that may be referred to as an outer ground electrode. The Q branch 222 of the modulator 200 includes a ground electrode 212 that may be referred to as an outer ground electrode. A third ground electrode 214 is positioned between the I branch 222 and the Q branch 224 of the modulator 200. The ground electrodes 210, 212, 214 may also be referred to as ground return current lines. An electrical driver 226 produces electrical modulation signals that produce differential signals for each of the I and Q modulator. I-signal electrodes 202, 204 are driven differentially with an in-phase modulation signal.

Q-signal electrodes 206, 208 are driven differentially with a quadrature modulation signal.

The configuration of electrodes for each of the I and Q branches 222, 224 of the modulator structure of FIG. 2 is referred to as a ground-signal-signal-ground (GSSG) structure. This GSSG terminology reflects the positions of the electrodes on the surface of the substrate 216 in a co-planar configuration as shown. The GSSG electrodes for each of the I branch 222 and Q branch 224 form electrical transmission lines that propagate the RF signals generated by the driver 226 along the substrate 216. These electrical signals modulate the optical phase in the underlying optical waveguides substantially over the modulation length 220.

In one embodiment of the coherent optical transmitter of the present teaching, crosstalk is reduced by using bond wires as electrical connections. In the configuration shown in FIG. 2, bond wires 228-1 ... 228-15 are used to connect the outer ground electrode 210 of the I branch 222 to the central ground electrode 214 at various locations along the length of the electrode 210. Bond wires 228-16 ... 228-30 are used to connect the outer ground electrode 212 of the Q branch 224 to the central ground electrode 214 along the length of the electrode 212. In some embodiments, bond wires 228-1, 228-16 are also positioned near the inputs of the ground electrodes 210, 212, 214 that are connected to the driver 226. The bond wires 228-2 ... 228-15, 228-17 ... 228-30 that are positioned along the modulation length 220 have a spacing 230. In some embodiments, the bond wire spacing 230 is uniform. In one specific embodiment, the bond wire spacing 230 is about 250 microns. Implementing bond wires in this way dramatically reduces mode conversion within I and Q branch and, hence, significantly reduces cross talk. The two electrical signal waveguides formed by the I and Q GSSG electrodes are terminated at the output end 232 of the modulator 200, typically with 55 ohm equivalent differential termination.

As mentioned above, the bond wires shown in FIG. 2 represent one embodiment of a discrete electrical connection that can be used to electrically connect ground electrodes at various points along their length. Other discrete electrical connectors may also be used. For embodiments that utilize bond wires, various types of wire bonding can be applied that are appropriate to the construction of the modulator and electrodes. In some embodiments, wedge bonding of gold wires is used. However, one skilled in the art will appreciate that various kinds of ball bonds and/or wedge bonds can also be used to electrically connect ground electrodes at various points along their length according to the present teaching. In addition, one skilled in the art will appreciate that various types of compliant bonding and various types of wire and tape connection techniques can also be used to electrically connect ground electrodes at various points along their length according to the present teaching. Furthermore, a variety of wire materials can be used including gold, platinum, silver, copper, aluminum, and/or alloyed aluminum. In some embodiments, the wire material is the same as the material of the electrode. It is generally desirable that the conductivity of the bondwires be as high as possible to provide the best RF electrical performance.

In various embodiments, the number and position of electrical connections, as well as the size and shape of the electrical connections are chosen to provide the desired RF response at or near the operating point of the transmitter. One skilled in the art will appreciate that there are many practical considerations when designing such transmitters. These practical considerations include, for example, the selection of convenient sizes, shapes, number, and position of the electrical connections as well as cost and manufacturability considerations of the various electronic and optoelectronic manufacturing techniques. The overall configuration of the electrical connections thereby causes the modifications of the RF electrical response that produce a desired optical performance for the modulated optical signal. As is clear to those skilled in the art, application of such known design principals can be used in connection with the ground-electrode connectors of the present teaching without departing from the present teaching.

As illustrated in the embodiment of FIG. 2, an array of equally spaced electrical connections may be used. In general, spacing of the electrical connections should be small enough so that a corresponding Bragg frequency occurs above the Nyquist frequency of the modulated signal. The Nyquist frequency is one-half the baud rate of the modulation signal. For example, for signals operating with up to a 100 GBd baud rate, a 250 µm electrical connector spacing is sufficient.

Figure 3:
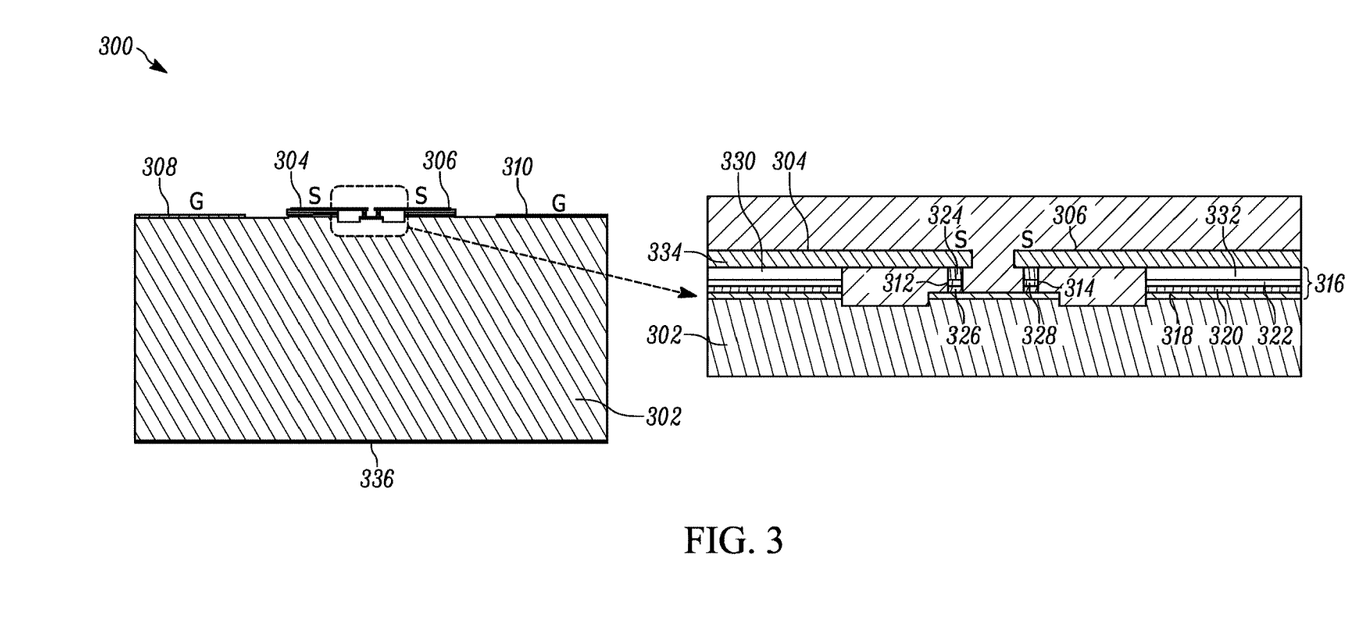
FIG. 3 illustrates a schematic of a cross-section of an embodiment of a Mach-Zehnder modulator using a ground-signal-signal-ground (GSSG) electrode structure according to the present teaching.

FIG. 3 illustrates a schematic of a cross section of an embodiment of a Mach-Zehnder modulator 300 using an GSSG electrode structure of the present teaching. The Mach-Zehnder modulator 300 is formed on an Indium Phosphide substrate 302. Two signal electrodes 304, 306 and two ground electrodes 308, 310 are positioned on the substrate 302. Details showing the signal electrodes 304, 306 and underlying optical waveguides 312, 314 is also shown in the figure. Optical waveguides are formed in the vertical direction by growing a layer structure 316 on the InP substrate 302. The layers include an InP highly n-doped layer 318, followed by a low-doped n-type InP layer 320. This is followed by an InP optical waveguide core layer 322 and an InP p-type doped layer 324.

Optical waveguides 312, 314 are formed in the horizontal direction by patterned etching and regrowth of the layer structure. Two waveguide cores 326, 328 are formed. Undoped InP layer sections 330, 332 are positioned as shown on either side of the two waveguide cores 326, 328. A metal layer 334 is deposited on the patterned layered structure. The two signal electrodes 304, 306 are formed that are positioned over the optical waveguide cores 326, 328 as shown. A backside metal layer 336 is applied to the bottom of the substrate 302.

The metal layers 334, 336 can include one or more of variety of conductive materials that are known to be appropriate for making electrical contact with the particular substrate material. For example, in some embodiments, one or both of the metal layers 334, 336 are gold. Other materials that can be used for the metal layers 334, 336 include silver, aluminum, and various metal alloys known in the art.

It should be understood that although the modulator 300 of FIG. 3 is described in connection with an InP substrate material, a variety of other known electro-optical material systems could be used in various embodiments including, for example, Lithium Niobate, GaAs, Silicon, Silicon on Insulator, and various other semiconductor material systems.

One feature of the coherent optical transmitter of the present teaching is that the electrical connections between the ground electrodes can be provided using a variety of electrical connector types. For example, in some embodiments, via holes connected to a top metallization layer can be used to provide the electrical connections between ground electrodes.

Figure 4:
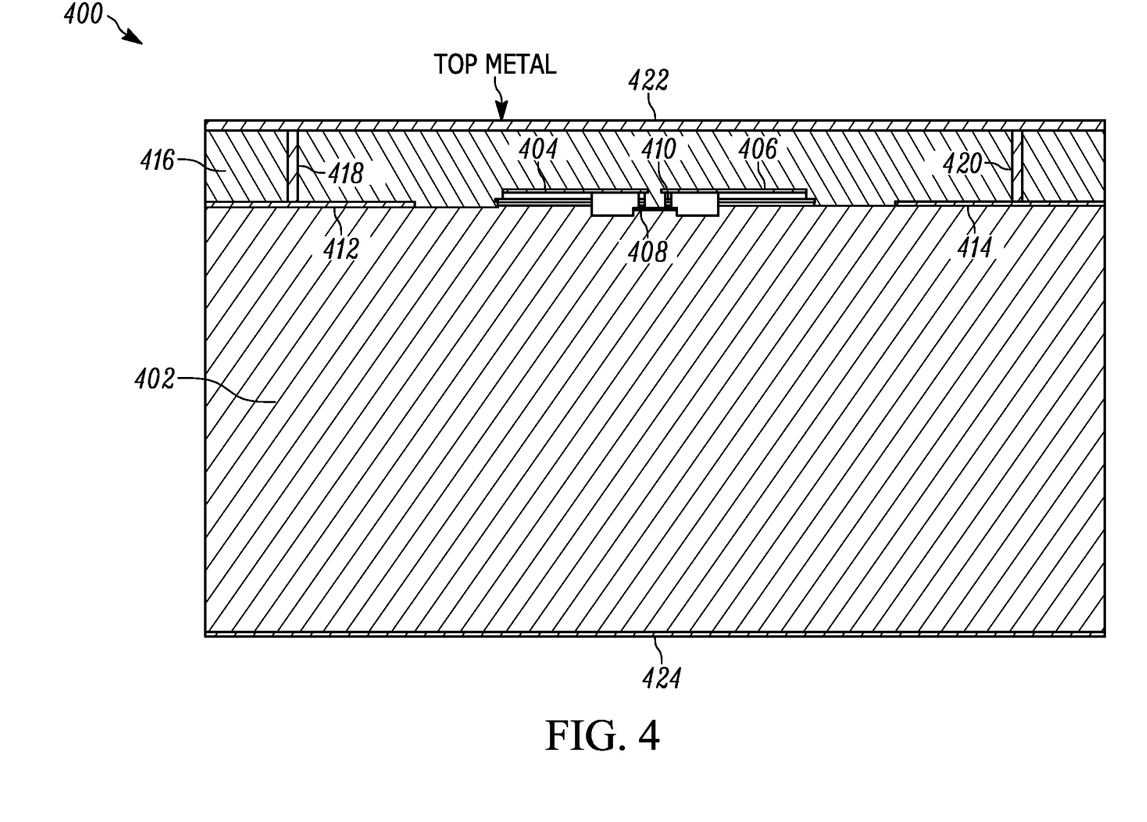
FIG. 4 illustrates a schematic of a cross-section of an embodiment of a Mach-Zehnder modulator using a ground-signal-signal-ground (GSSG) electrode structure and via holes according to the present teaching.

FIG. 4 illustrates a schematic of a cross-section of an embodiment of a Mach-Zehnder modulator 400 using a GSSG electrode structure and via holes according to the present teaching. The modulator 400 is formed on an Indium Phosphide substrate 402. The various waveguide layers (details not shown) can be the same or similarly to the waveguide layers described in connection with the Mach-Zehnder modulator using the GSSG electrode structure described in connection with FIG. 3. One skilled in the art will appreciate that numerous other waveguide layer structures can be used according to the present teaching.

Two signal electrodes 404, 406 are positioned over waveguides 408, 410. Two ground electrodes 412, 414 are positioned on either side of the signal electrodes 404, 406. A BCB (bisbenzocyclobutane) planarization layer 416 is positioned over the waveguide/electrode structure. Pairs of via holes 418, 420 are formed along the electrode structure, which run into the page on the illustration of FIG. 4. A top metal layer 422 is deposited which forms electrical connections between the two ground electrodes 412, 414 at each pair of via holes 418, 420. In addition, a metal layer 424 is positioned at the bottom of the substrate 402.

Figure 5A:
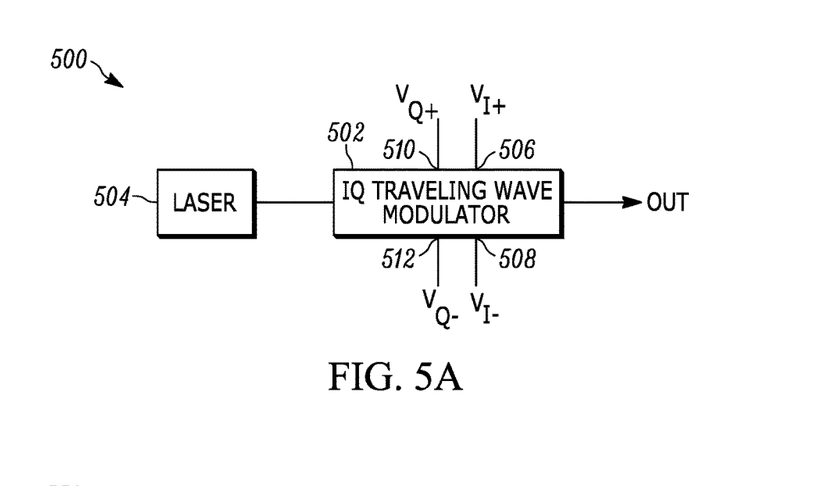
FIG. 5A illustrates a schematic of a coherent optical transmitter using an electro-optical IQ travelling wave Mach-Zehnder modulator according to the present teaching.

FIG. 5A illustrates a schematic of a coherent optical transmitter 500 using an electro-optical IQ travelling wave Mach-Zehnder modulator 502 according to the present teaching. The coherent optical transmitter 500 exhibits much lower cross talk as compared with the coherent optical transmitter 100 using the I and Q Mach-Zehnder modulators that was described in connection with FIG. 1.

A laser 504 includes an output that is optically coupled to an input of the electro-optical IQ travelling wave Mach-Zehnder modulator 502. For example, in one embodiment, the electro-optical IQ travelling wave Mach-Zehnder modulator 502 is the electro-optical IQ travelling wave Mach-Zehnder modulator 300 described in connection with FIG. 3. In various embodiments, the Mach-Zehnder modulator can use the ground-signal-signal-ground electrode structures 300, 400 described in connection with FIGS. 3 and 4. The electro-optical IQ travelling wave Mach-Zehnder modulator 502 includes differential signal inputs $V_{I+}$ 506 and $V_{I-}$ 508 and $V_{Q+}$ 510 and $V_{Q-}$ 512.

In operation, the signal input $V_{I+}$ 506 is provided with a positive voltage while the signal input $V_{I-}$ 508 is provided a negative version of the same voltage signal. Also, the signal input $V_{Q+}$ 510 is provided with a positive voltage while the signal input $V_{Q-}$ 512 is provided a negative version of the same voltage signal. This differential drive configuration for the I and Q modulators causes a positive electric field to be applied across the electro-optic material that is part of the optical waveguide core in one waveguide and a negative electric field to be applied across the electro-optic material that is part of the optical waveguide core in the other waveguide, such that the phase difference accumulated for light traveling in the two waveguides is additive.

In some embodiments, a net π phase difference between light traveling in the two arms is realized by applying $+V_\pi/2$ to one electrode and $-V_\pi/2$ to the other. Thus, in these embodiments, the differential dual-drive modulators require half the drive voltage of a single-drive modulator being driven to produce a π phase shift. In general, a variety of amplitude and phase modifications to the signals that modulate the phase of the light traveling in the optical waveguides are used to generate a variety of modulation formats. These electrical signals are also used to combat various forms of dispersion and other impairments in optical transport systems.

Figure 5B:
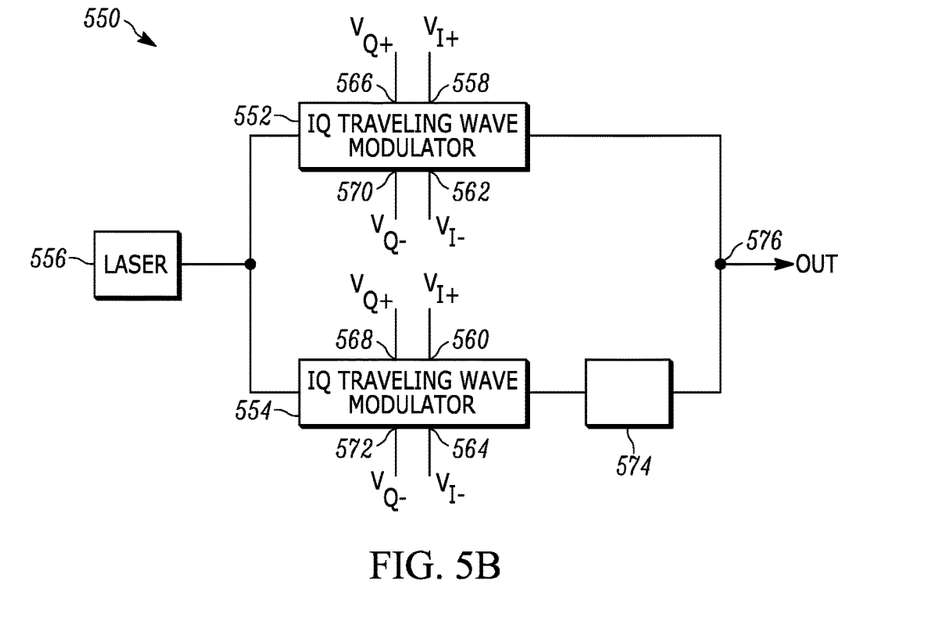
FIG. 5B illustrates a schematic of a dual-polarization IQ coherent optical transmitter that uses electro-optical IQ travelling wave Mach-Zehnder modulators according to the present teaching.

FIG. 5B illustrates a schematic of a dual-polarization IQ coherent optical transmitter 550 that uses electro-optical IQ travelling wave Mach-Zehnder modulators 552, 554 according to the present teaching. The dual-polarization IQ coherent optical transmitter 550 exhibits much lower cross talk between the X-polarization and the Y-polarization signals as compared with conventional dual polarization IQ modulators.

A laser 556 includes an output that is optically coupled to an input of a first and a second electro-optical IQ travelling wave Mach-Zehnder modulator 552, 554. In various embodiments, the Mach-Zehnder modulators 552, 554 can use the ground-signal-signal-ground electrode structures 300, 400 described in connection with FIGS. 3 and 4. The electro-optical IQ travelling wave Mach-Zehnder modulators 552, 554 include differential signal inputs $V_{I+}$ 558, 560 and $V_{I-}$ 562, 564, and $V_{Q+}$ 566, 568 and $V_{Q-}$ 570, 572. The output of the second electro-optical IQ travelling wave Mach-Zehnder modulator 554 is optically coupled to a polarization rotator 574. The output of the polarization rotator 574 is optically combined with the output of the first electro-optical IQ travelling wave Mach-Zehnder modulator 552 to form a dual-polarization IQ coherent optical signal output 576. In integrated dual-polarization transmitters, each Mach-Zehnder modulator 552, 554 passes the same polarization. The polarization rotator 574 is typically positioned after the integrated structure (i.e. chip) that comprises the first and second IQ travelling wave Mach-Zehnder modulators 552, 554. The rotation caused by the polarization rotator 574 designates the two relative polarizations (e.g., X and Y polarization) at the output 576. In operation, the first electro-optical IQ travelling wave Mach-Zehnder modulator 552 generates, for example an X-polarized modulated IQ signal and the second electro-optical IQ travelling wave Mach-Zehnder modulator 554 generates together with the polarization rotator 574, for example, a Y-polarized modulated IQ signal. Using the IQ travelling wave Mach-Zehnder modulator according to the present teaching, cross talk between the two polarization channels (e.g. X-polarization and Y-polarization) is significantly reduced compared to known IQ modulators.

One significant challenge for compact, highly-integrated optical transmitters that include compact modulators like the electro-optical IQ travelling wave Mach-Zehnder modulators 502, 552, 554 is crosstalk caused by nearby electrical structures. This is especially true for differentially driven co-planar waveguide-type electrical transmission lines structures like those described herein. Crosstalk is observed in the optically modulated signals that emerge from different branches of the modulators in the optical transmitter. Crosstalk becomes particularly challenging as the baud rates grow in excess of 10 GBd. In particular, cross talk reduction between I and Q branches of differentially driven Mach-Zehnder modulators becomes particularly critical for baud rates in excess of 16 GBd. Crosstalk ultimately leads to optical power penalties and to optical signal transport distance limitations resulting from the optical modulation. Electrical coupling via the ground return path is frequently one of the most significant causes of the cross talk.

Figure 6:
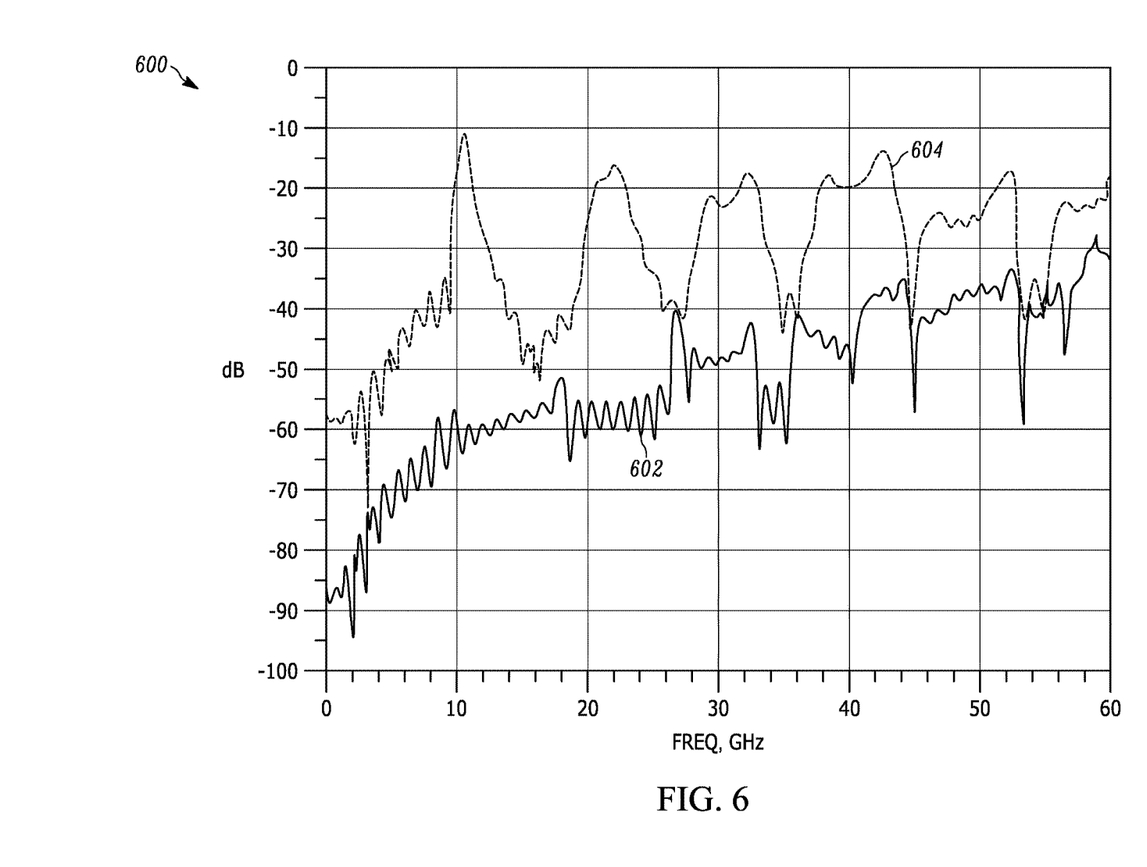
FIG. 6 illustrates a graph of electro-optical cross talk as a function of frequency between the I and Q modulated optical signals for the electro-optical IQ travelling wave Mach-Zehnder modulator described in connection with FIG. 2.

FIG. 6 illustrates a graph 600 of electro-optical cross talk as a function of frequency between the I and Q modulated optical signals for the IQ modulator described in connection with FIG. 2. Data is presented for the case where the IQ modulator includes bond wires (solid curve 602) and the case where the IQ modulator does not include bond wires (dashed curve 604). The curves 602, 604 are generated via simulation. The data show a very significant reduction in cross talk due to implementation of bond wires.

A method of reduced cross talk coherent optical transmission includes providing an optical source and an IQ modulator. The IQ modulator includes a substrate comprising a first Mach-Zehnder modulator comprising a first waveguide and a second waveguide, where the first Mach-Zehnder modulator has an input that is optically coupled to an output of the optical source, and a second Mach-Zehnder modulator comprises a first waveguide and a second waveguide, where the second Mach-Zehnder modulator has an input that is optically coupled to the output of optical source. The method includes positioning a first positive signal electrode on the substrate over the first waveguide of the first Mach-Zehnder modulator and positioning a first negative signal electrode on the substrate over the second waveguide of the first Mach-Zehnder modulator. The first positive signal electrode and the first negative signal electrode are both connected to a first differential signal input.

Similarly, the method includes positioning a second positive signal electrode on the substrate over the first waveguide of the second Mach-Zehnder modulator and positioning a second negative signal electrode on the substrate over the second waveguide of the second Mach-Zehnder modulator, where the second positive signal electrode and the second negative signal electrode are both connected to a second differential signal input;

In addition, a first ground electrode is positioned on the substrate between the first and second Mach-Zehnder modulators. A second ground electrode is positioned on the substrate adjacent to the first Mach-Zehnder modulator such that the first positive signal electrode and the first negative signal electrode are between the second ground electrode and the first ground electrode. A third ground electrode is positioned on the substrate adjacent to the second Mach-Zehnder modulator such that the second positive signal electrode and the second negative signal electrode are between the third ground electrode and the first ground electrode. A plurality of first electrical connections are formed from the first ground electrode to the second ground electrode and a plurality of second electrical connections are formed connecting the first ground electrode to the third ground electrode.

The output of the first Mach-Zehnder modulator and the output of the second Mach-Zehnder modulator are combined to provide an in-phase modulated optical signal in response to a first differential modulation signal applied to the first differential signal input and a quadrature modulated optical signal in response to a second differential modulation signal applied to the second differential signal input. The spacing between at least two of the plurality of first electrical connectors is chosen to achieve a desired cross talk between the in-phase modulated optical signal and the quadrature modulated optical signal. In one embodiment, the spacing between at least two of the plurality of first electrical connectors is chosen to spoil a cavity resonance of the first Mach-Zehnder modulator, thereby improving a signal integrity of the in-phase modulated optical signal in response to the first differential modulation signal.

One aspect of the present teaching is that the method and apparatus of implementing electrical connections between ground electrodes is not limited to IQ cross talk reduction. In fact, all optical signal channels generated using GSSG topology in the same modulator can benefit from improved performance. For example, in a dual polarization modulator, cross talk between two polarization channels is also reduced. In specific configurations, simulations have shown that the corresponding integrated cross talk noise (ICN) is below −40 dB for up to 100 GBd operation. Integrated crosstalk noise is a well-known standard for evaluating channel cross talk performance that is wildly used in the industry as an alternative to the insertion crosstalk ratio (ICR) for channel crosstalk evaluation.

Another feature of the methods and systems of the present teaching is that the electrical connections between the ground electrodes can also improve single modulated signal optical signal integrity in coherent optical transmitters. The electrical connections between the ground electrodes can be configured to mitigate cavity resonances that can be formed by the GSSG Mach-Zehnder modulator structure. The cavity resonances are undesirable as they translate into imperfections and performance degradation in the optical signals that are generated by the transmitters. Therefore, for embodiments using a single modulated signal and having electrical connections between the ground electrodes can lead to an improved electrical spectrum of the modulated optical signal. As a result, the optical performance of this channel of the optical transmitter is improved. Thus, using methods and systems according to the present teaching, optical transport distances, tolerance to impairments and/or bandwidth of the transmitter can all be improved.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. An electro-optical modulator comprising:
   a) a substrate comprising a first Mach-Zehnder modulator comprising a first waveguide and a second waveguide and a second Mach-Zehnder modulator comprising a first waveguide and a second waveguide;
   b) a first positive signal electrode positioned on the substrate over the first waveguide of the first Mach-Zehnder modulator and a first negative signal electrode positioned on the substrate over the second waveguide of the first Mach-Zehnder modulator, the first positive signal electrode and the first negative signal electrode being connected to a first differential modulation signal input;
   c) a second positive signal electrode positioned on the substrate over the first waveguide of the second Mach-Zehnder modulator and a second negative signal electrode positioned on the substrate over the second waveguide of the second Mach-Zehnder modulator, the second positive signal electrode and the second negative signal electrode being connected to a second differential modulation signal input;
   d) a first ground electrode positioned on the substrate between the first and second Mach-Zehnder modulators;
   e) a second ground electrode positioned on the substrate adjacent to the first Mach-Zehnder modulator such that the first positive signal electrode and the first negative signal electrode are between the second ground electrode and the first ground electrode;
   f) a third ground electrode positioned on the substrate adjacent to the second Mach-Zehnder modulator such that the second positive signal electrode and the second negative signal electrode are between the third ground electrode and the first ground electrode; and
   g) a plurality of first electrical connectors connecting the first ground electrode to the second ground electrode and a plurality of second electrical connectors connecting the first ground electrode to the third ground electrode, wherein a spacing between at least two of the plurality of first electrical connectors is chosen to achieve a desired cross talk between an optical signal generated by the first Mach-Zehnder modulator and an optical signal generated by the second Mach-Zehnder modulator.

2. The electro-optic modulator of claim 1 wherein a spacing of at least two of the plurality of second electrical connectors is chosen to achieve the desired cross talk between the optical signal generated by the first Mach-Zehnder modulator and the optical signal generated by the second Mach-Zehnder modulator.

3. The electro-optic modulator of claim 1 wherein the plurality of first electrical connectors comprises an array of first electrical connectors.

4. The electro-optic modulator of claim 3 wherein the array of first electrical connectors comprises an array of first electrical connectors with a uniform spacing.

5. The electro-optic modulator of claim 1 wherein the plurality of second electrical connectors comprises an array of second electrical connectors.

6. The electro-optic modulator of claim 5 wherein the array of second electrical connectors comprises an array of second electrical connectors with a uniform spacing.

7. The electro-optic modulator of claim 1 wherein the spacing between at least two of the plurality of first electrical connectors comprises a spacing of about 250 microns.

8. The electro-optic modulator of claim 1 wherein at least one of the plurality of first electrical connectors comprises a bond wire.

9. The electro-optic modulator of claim 1 wherein at least one of the plurality of first electrical connectors comprises a via hole.

10. The electro-optic modulator of claim 1 wherein the substrate comprises a semiconductor material.

11. The electro-optic modulator of claim 10 wherein the semiconductor material comprises indium phosphide.

12. The electro-optic modulator of claim 1 wherein the first Mach-Zehnder modulator comprises an in-phase Mach-Zehnder modulator.

13. The electro-optic modulator of claim 11 wherein the second Mach-Zehnder modulator comprises a quadrature-phase Mach-Zehnder modulator.

14. The electro-optic modulator of claim 1 wherein the cross talk between the optical signal generated by the first Mach-Zehnder modulator and the optical signal generated by the second Mach-Zehnder modulator is less than −40 dB.

15. The electro-optic modulator of claim 1 wherein a modulation bandwidth of the optical signal generated by the first Mach-Zehnder modulator is greater than 10 GHz.

16. The electro-optic modulator of claim 1 wherein a modulation bandwidth of the optical signal generated by the first Mach-Zehnder modulator is greater than 25 GHz.

17. The electro-optic modulator of claim 1 wherein the spacing between at least two of the plurality of first electrical connectors is chosen to spoil a cavity resonance of the first Mach-Zehnder modulator, thereby improving a single channel signal integrity.

18. An IQ optical transmitter comprising:
a) an optical source;
b) an IQ modulator comprising:
i) a substrate comprising a first Mach-Zehnder modulator comprising a first waveguide and a second waveguide, the first Mach-Zehnder modulator having an input that is optically coupled to an output of the optical source, and a second Mach-Zehnder modulator comprising a first waveguide and a second waveguide, the second Mach-Zehnder modulator having an input that is optically coupled to the output of optical source;
ii) a first positive signal electrode positioned on the substrate over the first waveguide of the first Mach-Zehnder modulator and a first negative signal electrode positioned on the substrate over the second waveguide of the first Mach-Zehnder modulator, the first positive signal electrode and the first negative signal electrode being connected to a first differential signal input;
iii) a second positive signal electrode positioned on the substrate over the first waveguide of the second Mach-Zehnder modulator and a second negative signal electrode positioned on the substrate over the second waveguide of the second Mach-Zehnder modulator, the second positive signal electrode and the second negative signal electrode being connected to a second differential signal input;
iv) a first ground electrode positioned on the substrate between the first and second Mach-Zehnder modulators;
v) a second ground electrode positioned on the substrate adjacent to the first Mach-Zehnder modulator such that the first positive signal electrode and the first negative signal electrode are between the second ground electrode and the first ground electrode;
vi) a third ground electrode positioned on the substrate adjacent to the second Mach-Zehnder modulator such that the second positive signal electrode and the second negative signal electrode are between the third ground electrode and the first ground electrode; and
vii) a plurality of first electrical connectors connecting the first ground electrode to the second ground electrode and a plurality of second electrical connectors connecting the first ground electrode to the third ground electrode; and
c) an optical combiner with a first input coupled to an output of the first Mach-Zehnder modulator and a second input coupled to an output of the second Mach-Zehnder modulator and an output that provides an in-phase modulated optical signal in response to a first differential modulation signal applied to the first differential signal input and a quadrature modulated optical signal in response to a second differential modulation signal applied to the second differential signal input,
wherein a spacing between at least two of the plurality of first electrical connectors is chosen to achieve a desired cross talk between the in-phase modulated optical signal and the quadrature modulated optical signal.

19. The IQ optical transmitter of claim 18 wherein the plurality of first electrical connectors comprises an array of bond wires.

20. The IQ optical transmitter of claim 19 wherein the array of bond wires comprises a spacing of 250 microns.

21. The IQ optical transmitter of claim 18 wherein the substrate comprises a semiconductor material.

22. The IQ optical transmitter of claim 21 wherein the semiconductor material comprises indium phosphide.

23. The IQ optical transmitter of claim 18 wherein the optical source comprises a laser.

24. The IQ optical transmitter of claim 18 wherein the spacing between at least two of the plurality of first electrical connectors is chosen to spoil a cavity resonance of the first Mach-Zehnder modulator, thereby improving a signal integrity of the in-phase modulated optical signal in response to the first differential modulation signal.

* * * * *